United States Patent [19]

Forrat

[11] 4,438,337
[45] Mar. 20, 1984

[54] APPARATUS FOR THE PURIFICATION OF WATER BY ULTRAVIOLET RADIATION

[75] Inventor: Francis Forrat, Grenoble, France

[73] Assignee: Commissariat a l'Energie Atomique, Paris, France

[21] Appl. No.: 348,211

[22] Filed: Feb. 12, 1982

[30] Foreign Application Priority Data

Feb. 26, 1981 [FR] France .............................. 81 03834

[51] Int. Cl.³ ............................................. G01N 21/01
[52] U.S. Cl. ..................................... 250/436; 210/243; 210/748; 422/24; 250/437
[58] Field of Search ............... 210/748, 192, 760, 243; 422/186.3, 24; 250/436, 437, 430, 432 R, 455.1; 137/599, 601

[56] References Cited

U.S. PATENT DOCUMENTS

| | | | |
|---|---|---|---|
| 2,298,124 | 10/1942 | Hartman | 250/430 |
| 2,738,427 | 4/1956 | Wagnon | 250/437 |
| 2,999,482 | 9/1961 | Bower | 137/599 |
| 3,836,781 | 9/1974 | Ellison | 250/436 |
| 4,297,222 | 10/1981 | Takeguchi et al. | 210/748 |
| 4,336,223 | 6/1982 | Hillman | 250/436 |
| 4,372,860 | 2/1983 | Kaas | 210/748 |

FOREIGN PATENT DOCUMENTS 2070900 9/1981 Fed. Rep. of Germany ...... 210/748

Primary Examiner—Charles N. Hart
Assistant Examiner—Sharon T. Cohen

[57] ABSTRACT

The present invention relates to an apparatus for the purification of water by ultraviolet radiation.

A pipe traversed by the liquid to be purified contains an ultraviolet lamp and an electrovalve electrically connected in series with the lamp and placed upstream of the latter. The resistance of the electrovalve is substantially equal to the load impedance of the lamp, the assembly being supplied with power by a solar collector.

Application to the purification of water.

4 Claims, 4 Drawing Figures

APPARATUS FOR THE PURIFICATION OF WATER BY ULTRAVIOLET RADIATION

BACKGROUND OF THE INVENTION

The present invention relates to an apparatus for the purification of water using ultraviolet radiation.

Most of the processes used at present in large water purification stations are chemical processes employing products such as chlorine, which leads to a certain number of disadvantages, e.g. the bactericidal action is relatively slow (approximately 1 hour) and nauseous odours are given off).

BRIEF SUMMARY OF THE INVENTION

The present invention is directed at an apparatus obviating these disadvantages by using ultraviolet lamps.

The present invention therefore relates to an apparatus for the purification of water, wherein it comprises at least one pipe traversed by the liquid to be purified, said pipe having at least one ultraviolet lamp and an electrovalve electrically connected in series with the lamp and placed upstream of the latter, the resistance of the electrovalve being substantially equal to the load impedance of the lamp, the assembly being supplied with power by a solar collector.

According to the preferred embodiment of the invention, the radiation emitted by the ultraviolet lamps is substantially equal either to 2537 Å or to 1850 Å.

It is known that the ultraviolet rays emitted by very low pressure, mercury vapour lamps have bactericidal properties, more particularly in the case of radiation at 2537 Å, which breaks organic bonds, and radiation of 1850 Å, which leads to the formation of ozone in media containing oxygen.

Ultraviolet radiation doses at 2537 Å leaving a 10% survival are approximately $2-10^{-5}$ Ws/mm$^2$ for bacteria and large viruses and $10^{-4}$ Ws/mm$^2$ for radioresistant bacteria, spores, small viruses, algae and moulds.

The radiant efficiency of the lamps is approximately 13%. As solar collectors of photovoltaic cells have an efficiency of 12 to 14%, the conversion efficiency is approximately 1.5% and the U.V. power which can be obtained is approximately 15 W/m$^2$, i.e. at least 10 times the U.V. power of direct solar radiation AM1 (the sun has traversed a mass of air equal to unity perpendicular to the receiver). The power density (power formed by 1 m$^2$ of lamp) obtained is approximately 300 W/m$^2$ (the lamp having a small surface) or 200 times the ultraviolet solar radiation power in AM1.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
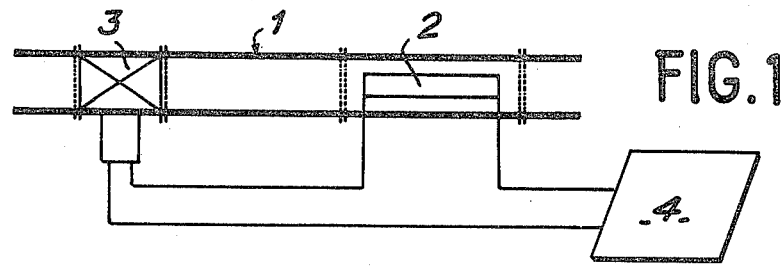
FIG. 1 a diagrammatic view showing the water purification apparatus according to the invention.

FIG. 1 diagrammatically illustrates the water purification apparatus according to the invention. An ultraviolet lamp 2 connected electrically in series with an electrovalve 3 is placed in a pipe 1. Electrovalve 3 is fitted in pipe 1 upstream of lamp 2 and its resistance is substantially equal to the impedance to be connected in series with the lamp for limiting and stabilizing the current. Thus, the energy which is normally lost in this resistance is used here for ensuring the operation and safety of the apparatus. Water can only circulate in pipe 1 if the electrovalve is open and the lamp ignited. FIG. 1 also shows a solar collector 4, supplying power to the assembly constituted by lamp 2 and electrovalve 3.

The apparatus functions in such a way that on applying voltage, a low ignition current passes from the lamp, which is not adequate for opening the electrovalve. The lamp is then in its first operating stage or heating state. On igniting the arc, current suddenly increases and is maintained at the operating value. At the time when the lamp starts to emit its ultraviolet radiation, the electrovalve opens permitting the passage of the liquid to be purified.

Figure 2:
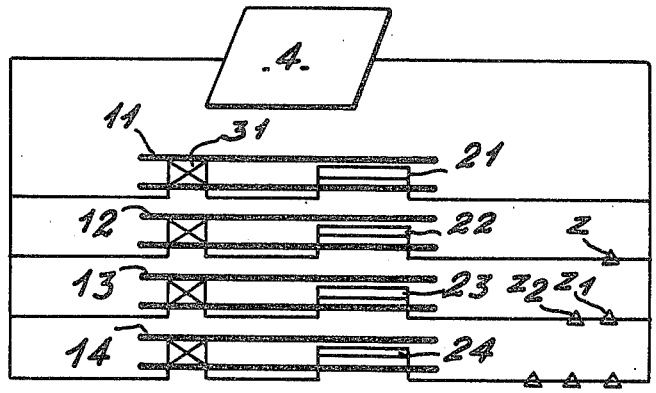
FIG. 2 a diagrammatic view of an apparatus with several water pipes, each provided with a lamp—electrovalve assembly according to the invention.

FIG. 2 illustrates a variant in which several pipes 11 to 14 are provided with lamp—electrovalve assemblies identical to that described hereinbefore. In this variant, there are four pipes, but it is obvious that a random number of such pipes can be used without passing beyond the scope of the invention.

FIG. 2 consequently shows four pipes 11 to 14, each having an ultraviolet lamp such as 21 connected in series with an electrovalve 31 in the manner described hereinbefore. The lamp—electrovalve assemblies are electrically connected in parallel and are supplied by a single solar collector 4.

In this case, means are provided to successively put into operation each lamp—electrovalve assembly as the voltage supplied by the collector increases.

In this embodiment, the means comprise a Zener diode Z in series with the second lamp 22, two Zener diodes $Z_1,Z_2$ in series with the third lamp 23 and so on, the lamp of rank n being protected by n−1 Zener diodes. There is no Zener diode in series with the first lamp 21.

The assembly operates in the following way. As illumination increases, the voltage at the terminals of the assembly increases to a value equal to the ignition threshold of the first lamp 21. The latter ignites, but the Zener diodes prevent the ignition of the other lamps. When the voltage continues to rise, lamp 22 protected by a single Zener diode ignites, but the other lamps protected by several Zener diodes remain extinguished. With a further voltage increases, lamps 23 and 24 ignite in turn. When the voltage decreases, the lamps are successively extinguished in the reverse order.

In the presently described embodiment, the lamps are protected by Zener diodes, but other types of diodes could also be used.

Figure 3:
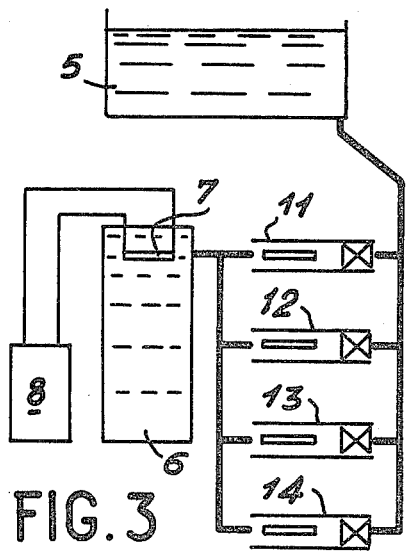
FIG. 3 a diagrammatic view of an apparatus like that of FIG. 2, but with a supplementary lamp positioned in the pure water storage tank.

FIG. 3 shows a variant in which pipes 11 to 14 are connected in parallel between a tank 5 containing the water to be purified and a pure water storage tank 6. An ultraviolet lamp 7, similar to the others, is fitted in tank 6 for safety purposes in case the storage time becomes too long, thereby increasing risks of new bacteria appearing. Lamp 7 can be supplied by the solar collector or by an external battery 8 during the times when the collector is not operating (e.g. at night).

Figure 4:
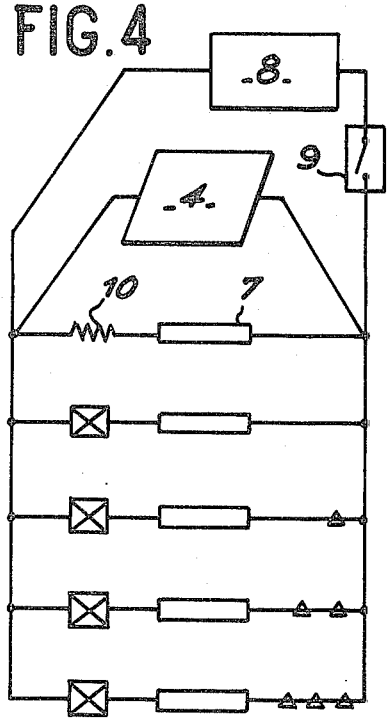
FIG. 4 a diagrammatic view of the electric circuit of the apparatus of FIG. 3.

FIG. 4 shows the circuit diagram of the device of FIG. 2. Lamp 7, in series with a resistor 10, is connected in parallel with the lamp—electrovalve assemblies. Power is supplied to all these means by solar collector 4, but a battery 8 can be used for supplying lamp 7, and only the latter, by means of switch 9, when the collector is not operating. Battery 8 can be recharged in the following way. At the time preceding ignition of a lamp, the photovoltaic cell does not supply all the converted energy and there are 10% losses, which can be recovered by the battery.

The apparatus according to the invention offers numerous advantages. Firstly, it has a very fast bactericidal action (1 minute instead of 1 hour with chlorine), it does not give off smells and the ozone produced by radiation at 1850 Å can oxidize certain poisons. There is also an excellent efficiency through the use of a solar collector and the simplicity of the installation greatly facilitates its maintenance. Finally, the energy which is generally lost in resistors connected in series with lamps is used for manipulating electrovalves, thus contributing to the operation and safety of the apparatus.

The invention is obviously not limited to the embodiments described and represented hereinbefore and numerous variants thereof are possible without passing beyond the scope of the invention.

What is claimed is:

1. An apparatus for the purification of water, wherein it comprises at least one pipe traversed by the liquid to be purified, said pipe having at least one ultraviolet lamp and an electrovalve electrically connected in series with the lamp and placed upstream of the latter, the resistance of the electrovalve being substantially equal to the load impedance of the lamp, wherein the apparatus further comprises a plurality of pipes transversed by the liquid to be purified, the lamp-electrovalve assemblies of each pipe being electrically connected in parallel, and the assembly being supplied with a power by a single solar cell collector.

2. An apparatus according to claim 1, wherein it comprises means for successively putting into operation each lamp—electrovalve assembly, as a function of the voltage supplied by the collector.

3. An apparatus according to claim 2, wherein the said means comprise at least one Zener diode placed at the input of certain circuits constituted by a lamp and its associated electrovalve.

4. An apparatus according to claim 2, wherein it comprises a purified water storage tank equipped with a supplementary ultraviolet lamp positioned in series with a resistor, whose value is equal to its load impedance, the assembly constituted by the lamp and the resistor being electrically connected in parallel with other lamp—electrovalve assemblies and can be supplied by an external power source when the solar collector is not operating.

* * * * *